United States Patent
Hughes et al.

(10) Patent No.: US 7,265,513 B2
(45) Date of Patent: Sep. 4, 2007

(54) VARIABLE RELUCTANCE ELECTRIC POWER SYSTEM

(76) Inventors: William Hughes, 6118 Greenleaf Ct., Rapid City, SD (US) 57702; Lance Gilmore, 1425 Dewey Blvd., Butte, MT (US) 59701; Duane Joseph Steichen, 5121 Chalkstone Dr., Rapid City, SD (US) 57701

(*) Notice: Subject to any disclaimer, the term of this patent is extended or adjusted under 35 U.S.C. 154(b) by 0 days.

(21) Appl. No.: 11/325,400

(22) Filed: Jan. 4, 2006

(65) Prior Publication Data
US 2007/0152623 A1 Jul. 5, 2007

(51) Int. Cl.
*H02P 1/46* (2006.01)
(52) U.S. Cl. .................. 318/701; 318/704; 318/723; 318/519; 318/376
(58) Field of Classification Search .......... 318/701, 318/704, 723, 798, 803, 140, 519, 376; 335/272; 290/14, 17; 310/171
See application file for complete search history.

(56) References Cited

U.S. PATENT DOCUMENTS

| | | | | |
|---|---|---|---|---|
| 4,292,531 | A * | 9/1981 | Williamson | 290/14 |
| 4,489,323 | A * | 12/1984 | Glennon et al. | 363/87 |
| 4,786,834 | A * | 11/1988 | Grant et al. | 310/194 |
| 5,375,098 | A * | 12/1994 | Malone et al. | 367/83 |
| 2002/0030572 | A1* | 3/2002 | Mohler | 335/272 |

* cited by examiner

*Primary Examiner*—Karen Masih
(74) *Attorney, Agent, or Firm*—Gene R. Woodle

(57) ABSTRACT

A variable reluctance electric power system which comprises an alternator and a motor having a rotor with longitudinal lobes and no windings, commutators, slip rings, magnets, or laminations. The alternator and the motor have stators which have conventional windings and laminations and a rotor which is polarized using a static field winding which surrounds but does not touch the rotor. The alternator and the motor may be coupled with current from the alternator driving the motor and solid state power devices controlling the frequency of the current to insure that the current from the alternator is always synchronized with the motor rotor.

11 Claims, 2 Drawing Sheets

VARIABLE RELUCTANCE ELECTRIC POWER SYSTEM

BACKGROUND OF THE INVENTION

1. Field of the Invention

The present invention relates generally to electric power systems and more specifically to a variable reluctance electric power system which may be used as an alternator, a motor, or in combination.

2. Background Information

In the United States and throughout the world, millions of people use electric motors and alternators on a daily basis. Conventional motors and alternators have a variety of configurations, but ordinarily consist of a metal case (usually steel), a stator which is secured inside the case, and a rotor which turns on bearings mounted at the ends of the case. There are other electric motor configurations, but a great majority have this configuration. A stator usually includes a series of laminations with interior windings, usually of copper wire. The laminations are insulated from each other, are stacked, and are configured so as to hold the stator windings within the interior of the stator. Rotors have many configurations, but often have windings, laminations, magnets, commutators, or slip rings.

Electric motors may be either alternating current (a-c) or direct current (d-c) motors. In a-c motors, the stator can be wound with either single or multiple phase windings. The most common a-c motors are three phase with the windings interspersed and displaced 120 electrical degrees from each other. The basic design of the most common a-c motor in use today, the induction motor, has been known since the late 1800's and it is still considered by many to be the most economical to build for any given horsepower. In spite of its popularity, the induction motor has several serious drawbacks including: its starting torque is very low, it requires six to eight times its rated full load current to start, and speed control is difficult and requires considerable auxiliary equipment to be accomplished effectively. In addition, induction motors most often have a rotor generally consisting of stacked laminations in which several generally shorted aluminum windings are embedded.

Common d-c motors are more desirable for many applications than a-c induction motors, because they have a much higher starting torque and do not require the high starting current. However, the rotor in these d-c motors must have windings, commutation bars, and brushes to conduct the rotor current. This rotor configuration makes them expensive to manufacture, expensive to maintain, and limits the speed at which the rotor can turn and keep the windings safely embedded. Some d-c rotors have embedded magnets which reduces or eliminates some of these problems, but there is some degradation of performance.

For a variety of well established reasons, standard electric power operates at a frequency of 50 or 60 Hz. Because of their necessary configurations, the fastest conventional alternators can run for generating conventional electric power is 3,600 rpm at 60 Hz and 3,000 rpm for 50 Hz. If a device such as a modern turbine which may easily operate a speeds of around 50,000 rpm's are used to power such alternators, the speed must be mechanically reduced to either 3,600 rpm or 3,000 rpm to function properly. Furthermore, the operating speed of the turbine must be rigidly controlled for proper operation.

The variable reluctance electric power system of the instant invention solves a number of problems common to conventional motors and alternators and may be constructed either in a motor configuration or an alternator configuration. The rotor of the instant invention is solid and does not include windings, brushes, commutators, slip rings, laminations, or embedded magnets such as in more conventional a-c or d-c motors. For lower speed applications, the rotor may have the configuration of a hollow squirrel cage. A high speed drive device such as a turbine may be used without the necessity of using mechanical speed reduction in the alternator configuration. Even though the motor configuration is, basically, an a-c motor, it does not require the high start up current of a conventional a-c motor. Further the instant invention provides high starting torque. That is, the instant invention provides the benefits of both conventional a-c and d-c motors without having their inherent drawbacks.

The ideal variable reluctance electric power system should operate with a solid rotor having no windings, brushes, commutators, slip rings, laminations, or embedded magnets. The ideal variable reluctance electric power system may also provide for a rotor having a hollow, squirrel cage type configuration for lower speed operation, also without the need for windings, brushes, commutators, slip rings, laminations, or embedded magnets. The ideal variable reluctance electric power system in the alternator configuration should provide for the use of a high speed power source such as a turbine without the need for mechanical speed reduction. The ideal variable reluctance electric power system in the motor configuration should eliminate the high startup current requirement of conventional a-c electric motors. The ideal variable reluctance electric power system in the motor configuration should also provide high starting torque. The ideal variable reluctance electric power system should also be simple, reliable, inexpensive, and easy to operate and maintain.

SUMMARY OF THE INVENTION

The variable reluctance electric power system of the instant invention may be operated as an alternator, as a motor, or in combination depending upon the associated auxiliary solid state equipment. The physical configuration of the alternator and the motor is basically the same. A case is provided which has the general shape of a hollow cylinder and which has bearings at either end. The case is made of a solid magnetic material and serves as the back iron to conduct magnetic flux longitudinally. Two conventionally wound stators fit within the case and are typically located at either end of the case. The stators are generally wound for three phase operation, although other phase windings could be used. A field winding which is simply a coil of insulated copper wire in the preferred embodiment, is located between the two stators. A magnetic steel rotor having a generally cylindrical shape rides on the bearings of the case. The rotor has a drive shaft which protrudes from one of the bearings and a ride shaft which rides on the other bearing.

The rotor has six lobes which run parallel to the longitudinal axis of the case and which protrude toward the case from the longitudinal axis of the rotor. These lobes are arrayed regularly around the circumference of the rotor. There is a critical air gap between the outer surface of the lobes of the rotor and the inner surface of the stators as well as a non critical air gap between the outer surface of the lobes and the field winding. This six lobe configuration is for operation with typically wound twelve pole stators. It should be understood that various other configurations may be used such as; if the stators were wound as a four pole machine, there would be two lobes; for a six pole machine, three lobes; an eight pole machine, four lobes and so on.

A relatively small direct current is passed through the field winding. This has the effect of creating north poles at one end of the lobes of the rotor and south poles at the other ends. By any of a number of conventional means, the current directed through the field coil may easily be controlled and, thus, the strength of the magnetic field created at the lobes of the rotor may easily be controlled.

When the instant invention is being operated as an alternator, the drive shaft of the rotor may be connected to a prime mover such as a high speed turbine which may turn at any efficient speed, perhaps as high as 100,000 rpm. As with a conventional alternator, the rotation of the polarized lobes of the rotor induces an electric current in the windings of the two stators. The frequency of this current will vary, depending upon the speed of the rotor, but typically would be many times higher than the conventionally usable 60 Hz or 50 Hz.

Any of several conventional solid state solid state switching systems may be used to modify the frequency of the output from the alternator of the instant invention to change the frequency to any optimum usable frequency such as 50 Hz or 60 Hz. In working models of the instant invention, insulated gate bipolar transistors (IGBT's) and silicon control rectifiers (called SCR's) in a cycloconverter configuration have been used. Both of these systems are known in the prior art.

In its motor configuration, the instant invention is the same as in the alternator description above except that the drive shaft powers any operating unit such as a wheel, gear or any other device which might be driven by an electric motor. In addition, the motor includes a sensor which instantaneously sense position of the rotor. The sense signals are then used to trigger a solid state inverter system, the output frequency of which is thus exactly synchronized with the rotor. Thus, the rotor speed controls the frequency of the solid state switching system.

In summary, the variable reluctance electric power system of the instant invention has many aspects, but may be used as an alternator to generate high frequency alternating current from a high speed prime mover such as a turbine. The high frequency alternating current from the alternator may be converted by the switching system to provide a different frequency to operate the instant invention in its motor configuration.

The above describes the basic operating principal of the variable reluctance electric power system of the instant invention in one embodiment. There are a number of other embodiments and elements which are described in detail below.

One of the major objects of the present invention is to provide either an alternator or a motor which operates with a solid rotor having no windings, brushes, commutators, slip rings, laminations, or embedded magnets.

Another objective of the present invention is to provide for a rotor having a hollow, squirrel cage type configuration for lower speed operation, also without the need for windings, brushes, commutators, slip rings, laminations, or embedded magnets Another objective of the present invention to provide for the use of a high speed power source such as a turbine without the need for mechanical speed reduction.

Another objective of the present invention is to eliminate the high startup current requirement of conventional a-c electric motors.

Another objective of the present invention is to provide high starting torque.

Another objective of the present invention is to provide a variable reluctance electric power system which is simple, reliable, inexpensive, and easy to use and maintain.

These and other features of the invention will become apparent when taken in consideration with the following detailed description and the drawings.

DESCRIPTION OF A PREFERRED EMBODIMENT

Figure 1:
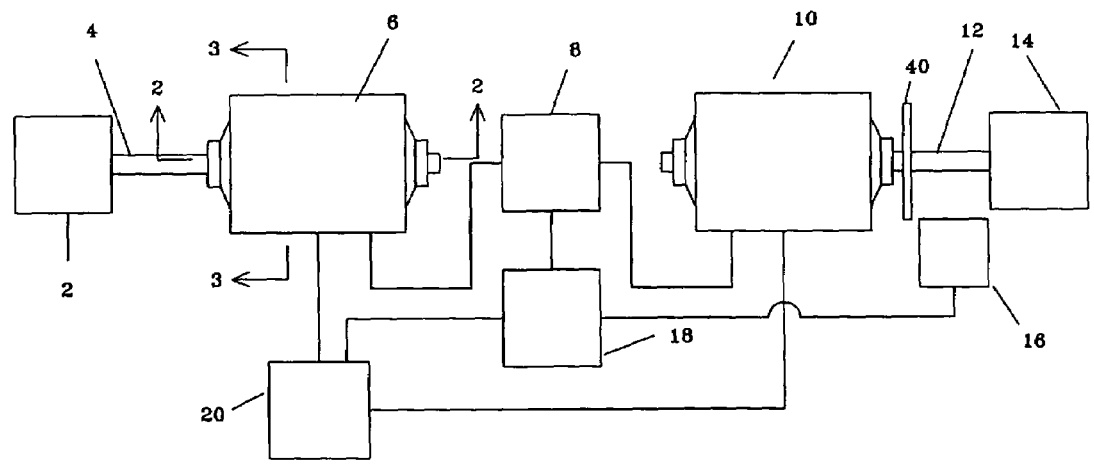
FIG. 1 is a schematic drawing of the variable reluctance electric power system of the instant invention.

Referring to the drawings, FIGS. 1 through 8, there is shown a preferred embodiment of the variable reluctance electric power system of the instant invention. The instant invention is shown and described below as a complete electric power system, but many of the elements of the invention could be used separately or in conjunction with a variety of conventional electric or electronic elements without changing the spirit of the invention.

Now referring to FIG. 1, a schematic drawing of the variable reluctance electric power system of the instant invention is shown. A prime mover 2 could be any of a number of conventional power sources. For purposes of this discussion, the prime mover 2 will be assumed to be a turbine operating at any speed up to, or perhaps even beyond, 100,000 rpm. Said prime mover 2 is connected by an alternator drive shaft 4 to an alternator 6 of the instant invention. The output of the alternator 6 is a high frequency polyphase current which is routed to a solid state switching system 8. The switching system 8 uses any of several known solid state systems to change the frequency of the current output from said alternator 6. In creation and operation of experimental working models of the instant invention, insulated gate bipolar transistors (known as IGBT's) and silicon control rectifiers (known as SCR's) in a cycloconverter configuration were used for said switching system 8.

Still referring to FIG. 1, output from said switching system 8 powers a motor 10. The motor 10 turns a motor drive shaft 12 which, in turn, powers any operating unit 14. The operating unit 14 may be a wheel, for instance, or any of a number of devices which may ordinarily be operated by an electric motor. A sensor 16 senses the speed and location of the rotor (not shown in this Figure) which spins inside said motor 10. Output from the sensor 16 goes to a controller 18. A DC source 20 supplies variable direct current to field windings (not shown in this Figure) within said alternator 6 and said motor 10. The controller 18 controls both said switching system 8 and the DC source 20.

Figure 2:
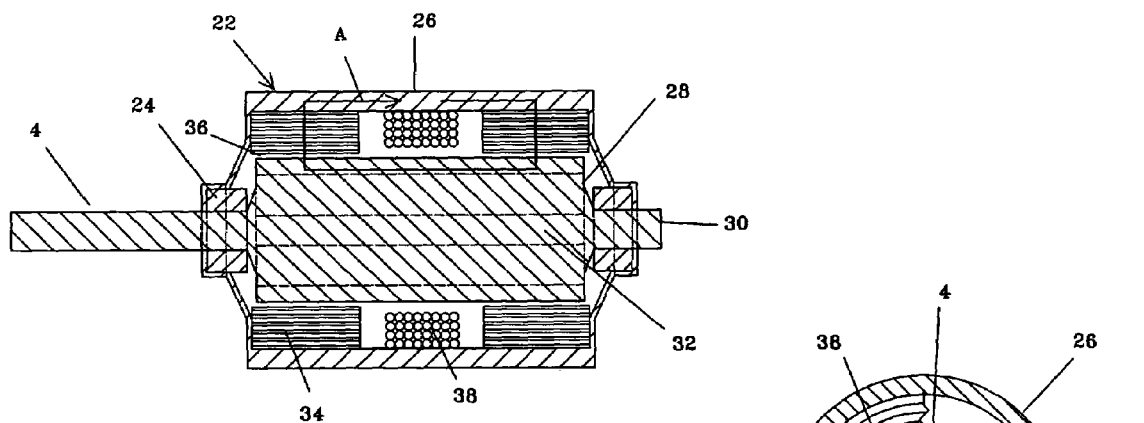
FIG. 2 is a sectional view the alternator aspect of the instant invention taken along line 2-2 of FIG. 1.

Referring now to FIG. 2, a sectional view of said alternator 6 of the instant invention taken along line 2-2 of FIG. 1 is shown. (This sectional view also shows a sectional view of said motor 10 with very few differences as described in detail below.) Said alternator 6 includes a case 22 having the general shape of a hollow cylinder with end caps holding a pair of conventional bearings 24. (Specialized bearings 24 may be appropriate for some applications.) The solid steel outer surface of the case 22 serves as the back iron 26. The back iron 26 provides part of the magnetic flux path indicated by arrow A. Said back iron 26 serves a purpose very similar to what is referred to as the back iron in conventional motors except that the flux path is longitudinal rather than perpendicular.

Still referring to FIG. 2, a rotor 28 is connected to said alternator drive shaft 4 and rides within said case 22 upon the bearings 24. Said alternator shaft 4 rides on one set of said bearings 24 and a second alternator shaft 30 rides on the other set of said bearings 24. The rotor 28 has the general shape of a solid cylinder, however, six equally spaced lobes 32 protrude outward from said rotor 28 and run the length of said rotor 28 along the longitudinal axis of said case 22. A pair of stators 34 having the general shape of a hollow cylinders are affixed to the inner surface of said case 22 such that there is an air gap 36 between the inner surface of the stators 34 and the outer surface of the lobes 32 on said rotor 28. The stators 34 are located at either end of said case 22. Except for their position and configuration, said stators 34 are conventionally wound for poly phase output and consist of conventional insulated steel laminations and windings. Production of similar stators is well known in the art. In the embodiment shown, said stators 34 are wound as for a twelve pole machine. The flux path (as indicated by arrow A) is significantly different than in a conventional alternator or motor. This flux path may be described as from one end of said rotor 28, up through one of said stators 34, up into said case 22, longitudinally along said back iron 26, down through the other of said stators 34, through the other end of said rotor 28, and, longitudinally, along the length of said rotor 28. A field winding 38, having the general shape of a hollow cylinder, is affixed to the inner surface of said case 22 between said stators 34. The field winding 38 is a multi-layered solenoid coil.

Still referring to FIG. 2, a relatively small direct current is passed through said field winding 38 by said d-c source 20. According to well known principles, the direct current in said field winding 38 polarizes said lobes 32 in said rotor 28 creating north poles at one end of said lobes 32 and south poles at the other end. Said prime mover 2 turns said alternator drive shaft 4 at some appropriate speed which is often very high which, of course, turns said rotor 28 at the same speed. Again, according to principles well known in the art, the spinning of said rotor 28 with its polarized lobes 32 within said stators 34 generates a poly phase current within said stators 34 at a frequency determined by the speed of said prime mover 2. The strength of this generated current within said stators 34 depends upon the strength of the polarization of said lobes 32. The strength of this polarization is easily controlled by the direct current within said field winding 38.

Still referring to FIG. 2, said field winding 38 and said stators 34 are shown and described as being configured with two of said stators 34 near the ends of said case 22 with said field winding 38 in between. Various other configurations could be used without changing the spirit of the instant invention. For example, the device would still work (perhaps less efficiently) with a single stator 34 and a single field winding 38 or with a single stator 34 between two of said filed windings 38.

Figure 3:
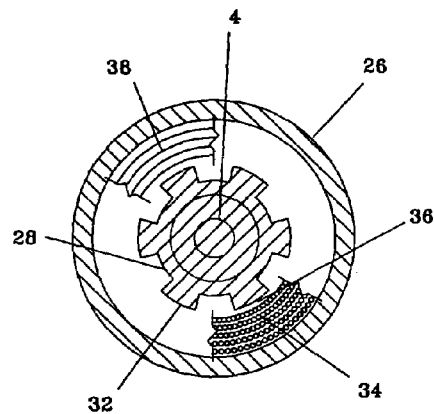
FIG. 3 is sectional view of the alternator aspect of the instant invention taken along line 3-3 of FIG. 1.

Referring now to FIG. 3, sectional view of the instant invention taken along line 3-3 of FIG. 1 is shown. This view better shows the configuration and relationship of some of the elements previously described. As may be clearly seen in this Figure, said field winding 38 encircles, but does not touch said rotor 28. This Figure, perhaps, also gives a better sense of the alignment and position of the windings in said stator 34. Note said air gap 36 between said stator 34 and the outermost surface of said lobes 32.

Referring again to FIG. 1, in the motor configuration of the instant invention, said motor 10 is nearly the same as said alternator 6. Physically, the only differences between said motor 10 and said alternator 6 are that what is shown in this Figure is said second alternator drive shaft 30 becomes said motor drive shaft 12 and there is a sensor plate 40 (see FIG. 8) affixed to said motor drive shaft 12. Said motor drive shaft 12 may be made longer or shorter to accommodate its connection to said operating unit 14.

Figure 8:
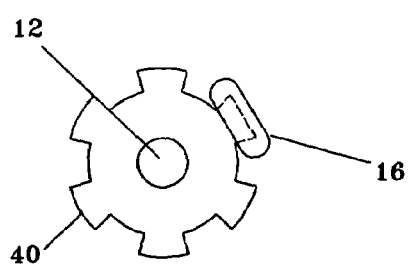
FIG. 8 is an end view of the sensor plate and sensor of the instant invention.

Referring now to FIG. 8, an end view of the sensor plate 40 and said sensor 16 are shown. Said sensor plate 40 is a flat plate which complements the cross section of said rotor 28 (not shown in this Figure). That is, as said motor drive shaft 12 turns, the protrusions on said sensor plate 40 exactly mirror the speed and position of said lobes 32 (not shown in this Figure). In the preferred embodiment, said sensor 16 is a conventional infrared sensor and the protrusions of said sensor plate 40 periodically break the infrared beam. Because said sensor 16 does not rotate with said sensor plate 40, said sensor 16 can, effectively, sense the speed and position of said lobes 32 on said rotor 28. It will be understood that any of a variety of means for instantaneously detecting the position of said rotor 28 in said motor 10 could be used rather than the infrared sensor 16 or said sensor plate 40 described above. For example, magnetic or other mechanical means could be used.

Figure 4:
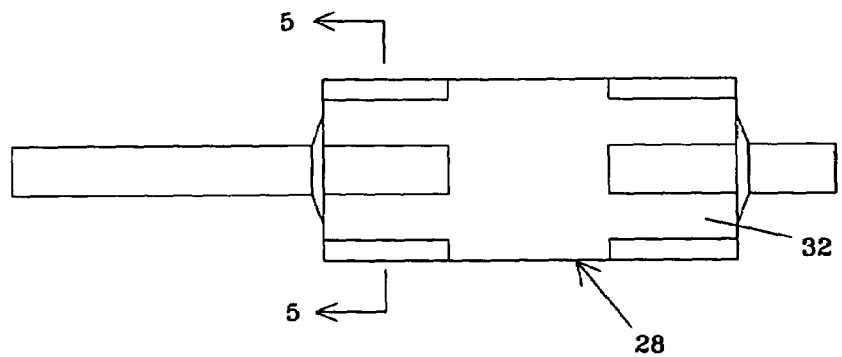
FIG. 4 is a side view of an second rotor embodiment of the instant invention.

Referring now to FIG. 4, a side view of a second embodiment of said rotor 28 is shown. As described above, said lobes 32 run the entire length of the body of said rotor 28. In the embodiment shown in FIG. 4, said lobes 32 do not run the length of said rotor 28, but occur only directly below said stators 34 (not shown in this Figure). It will be understood that shaping the poles of said rotor 28 may be used to provide an endless variety of wave shapes in the output of said stators 34.

Figure 5:
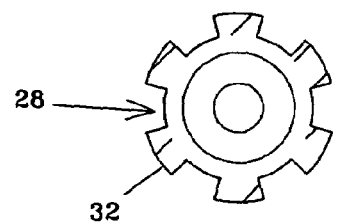
FIG. 5 is a sectional view of the second rotor embodiment taken along line 5-5 of FIG. 4.

Referring now to FIG. 5, a cross sectional view of the second embodiment of said rotor 28 taken along line 5-5 of FIG. 4 is shown. This Figure provides a better idea of the second configuration of said rotor 28. Said lobes 32 occur only at the ends of the body of said rotor 28. The center of said rotor 28 may be a solid cylinder or may be hollow.

Figure 6:
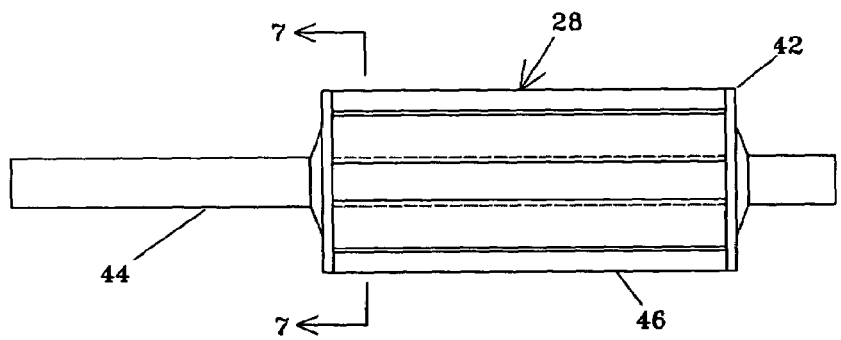
FIG. 6 is side view of a third rotor embodiment of the instant invention.

Referring now to FIG. 6, a side view of a third embodiment of said rotor 28 is shown which has the general configuration of a hollow squirrel cage. In this embodiment the body of said rotor 28 is not solid. A shaft 44 runs the length of said rotor 28 and a pair of end plates 42 are affixed to the shaft 44 at the position where the ends of the body of said rotor 28 would be in the previously described embodiments. Said lobes 32 (not present in this Figure) are replaced by a similarly configured series of bars 46 affixed between the two end plates 42. This embodiment would be useful and less expensive in lower speed machines. It may be necessary to include a central plate affixed to the center of said bars 46 to insure that said bars 46 do not bow outward.

Figure 7:
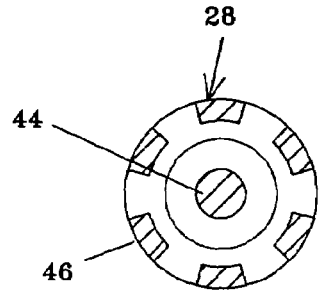
FIG. 7 is a sectional view of the third rotor embodiment taken along line 7-7 of FIG. 6.

Referring now to FIG. 7, a cross section view of the embodiment of said rotor 28 shown in FIG. 6 shown taken along line 7-7 of FIG. 6. This Figure better shows the configuration of said bars 46 and that the portion of said rotor 28 between said shaft 44 and said bars 46 is hollow. In this configuration of said rotor 28, said rotor 28 is much lighter than in the two previously described embodiments and should have much better cooling characteristics which may be preferable for some applications.

It should be understood that the embodiments of said rotor 28 shown in FIGS. 4, 5, 6, and 7; work in exactly the same manner as described above for the first embodiment of said rotor 28 and may be used in either the alternator configuration or the motor configuration of the instant invention.

In operation, said prime mover 2 (which might be, for example, a turbine) turns said alternator shaft 4. The greatest benefits of the variable reluctance electric power system of the instant invention are realized if the operating speed of said prime mover 2 is significantly greater than the operating speed of said operating unit 14. For example, said prime mover 2 might be a turbine operating at 50,000 rpm and said operating unit 14 might be the drive wheel of a vehicle. In this example, the drive wheel would most likely operate at from zero rpm to less than 1,000 rpm. With a conventional system, the 50,000 rpm of the turbine would have to be mechanically reduced to the 0-1,000 rpm operating speed of the drive wheel and the speed of the turbine rigidly controlled. With the instant invention all of the speed reduction is accomplished electrically and electronically.

In the example, said prime mover 2 turns said alternator shaft 4 and said rotor 28 at perhaps 50,000 rpm. (It should be understood that the same operation could be achieved using virtually any prime mover operating at virtually any speed.) A small direct current from said DC source 20 is applied to said field winding 38 which effectively polarizes said lobes 32 creating north and south poles in said lobes 32. According to principles well known in the field, the rotational movement of polarized lobes 32 induces an alternating current in said stators 34 at a frequency determined by the speed of said rotor 28. The strength of the current induced in said stators 34 may be controlled by controlling the direct current from said d-c source 20. That is, the stronger the polarity induced in said lobes 32 by that direct current, the stronger the current induced in said stators 34.

The outputs of corresponding phases of both of said stators 34 may be connected either in parallel or in series to give a conventional poly phase output. For some applications, it may be appropriate to keep the phases separate rather than connect them in a conventional Y or DELTA to minimize iron losses in the machines. This is particularly true when, for a variety of reasons, it is desired to have wave form outputs other than sine waves. The instant invention has been consistently described as being a poly phase machine and said stators 34 may be wound to create nearly any appropriate phase configuration.

A poly phase alternating current from said stators 34 is directed to said switching system 8. Using any of a number of well known conventional components and solid state systems, the frequency of this current is changed by said switching system 8 to power said motor 10. Said motor 10 is configured much the same as said alternator 6 and said motor 10 operates, basically, in reverse of said alternator 6. The current from said switching system 8 flows through said stators 34 and said lobes 32 are also polarized by direct current from said d-c source 20 flowing through said field winding 38. Again, according to well known principles, said rotor 28 spins and turns said motor drive shaft 12 which, in turn turns said operating unit 14 (in the example, the drive wheel of a vehicle). The speed and torque at which said rotor 28 and said motor drive shaft 12 turn are controlled by the amount of direct current directed to said field winding 38 from said DC source 20. It may be understood that it would be a relatively simple matter to split off sufficient direct current from said switching system 8 to supply power to said d-c source 20.

Said sensor 16 senses the position of said lobes 32 is said motor 10 and sends a signal to the controller 18. Said controller 18 controls said switching system 8 such that the frequency of the alternating current from said switching system 8 matches the speed of said rotor 28 in said motor 10. Said controller 18 also controls the amount of current from said d-c source 20 which flows to said filed windings 38 in said alternator 6 and said motor 10. In the preferred embodiment said controller 18 includes a simple rheostat which increases or decreases the d-c current to said field windings 38 in said alternator 6 and said motor 10. Said controller 18 further includes a conventional open loop operational amplifier which receives the signals from said sensor 16 and converts the signals to clean, square wave signals. That is, the signals are converted to what may be considered either an on or off state. Thus, said controller 18 uses these square wave signals to drive the SCR's or IGBT's in said switching system 8.

In the example described above, a turbine powered vehicle, the speed of the drive wheel (said operating unit 14) is controlled by said controller 18. That is, by increasing or decreasing the d-c current to said field winding 38 in said motor 10, the speed of the drive wheel is increased or decreased. Using signals received from said sensor 16, said controller 18 further controls said switching system 8 to automatically insure that the frequency of the current into said motor 10 is exactly synchronized with said rotor 28 in said motor 10. It should be understood that the same process could be applied to virtually any operating unit 14 and not just to a vehicle drive wheel.

Because the polarization of said rotor 28 is accomplished by said field windings 38 rather than by the induction method used in conventional induction motors, the high starting current requirement of those induction motors does not occur with said motor 10 of the instant invention.

Although described above as being a variable reluctance electric power system with said alternator 6 being coupled with said motor 10, said alternator 6 and said motor 10 could also be used separately where appropriate. For example, said alternator 6 could be used to supply electricity to a power grid with the output frequency changed as necessary by said switching system 8.

All elements of the variable reluctance electric power system are made of steel except for those described below, but other material having similar strength, and magnetic properties could be used. Said case 22 and said rotor 28 are made from 4140 alloy steel, but any solid magnetic material having similar characteristics such as 4340 alloy steel could be used.

While preferred embodiments of this invention have been shown and described above, it will be apparent to those skilled in the art that various modifications may be made in these embodiments without departing from the spirit of the present invention. That is, the device could be used for a wide variety of purposes either in combination or separately.

We claim:

1. An electric power system which includes an alternator comprising:
   (1) a case made of magnetic material;
   (2) at least one conventional stator winding with laminations within the case;
   (3) a solid rotor having at least two lobes made of magnetic material, the lobes protruding outward from the rotor, and said rotor capable of rotating relative to the stator with an air gap between said stator and said rotor;
   (4) a field winding adjacent to said stator capable of polarizing said lobes on said rotor such that said lobes have a north pole at one end and a south pole at the other end;
   (5) said rotor being capable of being driven by at conventional prime mover at any speed from very low to very high;
   (6) said rotor moving relative to said stator giving a polyphase current output; and
   (7) a solid state switching device capable of converting the polyphase current output to any frequency;
   whereby the polyphase current output from the alternator may be converted to any appropriate frequency for conventional electric power use either stand alone or synchronized with the power grid.

2. The electric power system of claim 1 in which said rotor is not solid, but has a hollow squirrel cage configuration having at least two lobes which is capable of being polarized.

3. The electric power system of claim 2 in which said rotor is not solid, but has a hollow squirrel cage configuration having at least two lobes which are capable of being polarized.

4. An electric power system which includes an alternator comprising:
   (1) a case made of a magnetic material;
   (2) at least one conventional stator winding with laminations within the case;
   (3) a solid rotor having at least two lobes made of magnetic material, the lobes protruding outward from the rotor, and said rotor capable of rotating relative to the stator with and air gap between said stator and said rotor;
   (4) a field winding adjacent to said stator capable of polarizing said lobes on said rotor such that said lobes have a north pole at one end and a south pole at the other end and the field winding is capable of changing the strength of the polarization of said lobes;
   (5) said rotor being capable of being driven by a conventional prime mover at any speed from very low to very high;
   (6) said rotor moving relative to said stator giving a polyphase current output; and
   (7) a solid state switching device capable of converting the polyphase current output to any frequency;
   whereby the power current output of the alternator is controlled entirely by the speed at which the rotor is turned and the strength of the polarization of said lobes of said rotor by said field winding.

5. An electric power system which includes a motor comprising:
   (1) a case made of a magnetic material;
   (2) at least one conventional motor stator winding with laminations within the case;
   (3) a solid motor rotor having at least two lobes made of magnetic material, the lobes protruding outward from the rotor, and said rotor capable of rotating relative to the stator with and air gap between said stator and said rotor;
   (4) a motor field winding adjacent to said stator capable of polarizing said lobes on said rotor such that said lobes have a north pole at one end and a south pole at the other end;
   (5) said rotor being capable of being rotated by polyphase current applied to said stator;
   (5) a sensor capable of sensing the speed and position of said rotor; and
   (6) a solid state motor control capable of receiving signals from the sensor and capable of changing the frequency of the polyphase current applied to said stator such that the frequency of the polyphase current applied to said stator is always synchronized with the frequency of said rotor;
   whereby, if the rotor slows down or speeds up because of load changes, the driving frequency changes proportionally.

6. The electric power system of claim 5 in which said rotor is not solid, but has a hollow squirrel cage configuration having at least two lobes which are capable of being polarized.

7. An electric power system which includes a motor comprising:
   (1) a case made of a magnetic material;
   (2) at least one conventional motor stator winding with laminations;
   (3) a solid motor rotor having at least two lobes made of magnetic material, the lobes protruding outward from the rotor, and said rotor capable of rotating relative to the stator with and air gap between said stator and said rotor;
   (4) a motor field winding adjacent to said stator capable of polarizing said lobes on said rotor such that said lobes have a north pole at one end and a south pole at the other end and the field winding is capable of changing the strength of the polarization of said lobes by means of a variable d-c current through the field winding;
   (5) a sensor capable of sensing the speed and position of said rotor; and
   (6) a solid state motor control capable of varying the d-c current through said field winding and capable of receiving signals from the sensor and capable of changing the frequency of the polyphase current applied to said stator such that the frequency of the polyphase current applied to said stator is always synchronized with the frequency of said rotor;
   whereby, the frequency of the electric power driving the motor is controlled entirely by the rotor speed and position and the rotor never gets out of synchronism even at zero speed and the electric motor has extremely high starting torque.

8. The electric power system of claim 7 in which said rotor is not solid, but has a hollow squirrel cage configuration having at least two lobes which are capable of being polarized.

9. An electric power system including an alternator and motor comprising:
   (1) an alternator case made of a magnetic material;
   (2) at least one conventional alternator stator winding with laminations within the alternator case;
   (3) a solid alternator rotor having at least two lobes made of magnetic material, the lobes protruding outward from the alternator rotor, and said alternator rotor capable of rotating relative to the alternator stator with and air gap between said alternator stator and said alternator rotor;

(4) an alternator field winding adjacent to said stator capable of polarizing said lobes on said alternator rotor such that said lobes have a north pole at one end and a south pole at the other end and the alternator field winding is capable of changing the strength of the polarization of said lobes;

(5) said alternator rotor being capable of being driven by a conventional prime mover at any speed from very low to very high;

(6) said alternator rotor moving relative to said alternator stator giving a polyphase current output;

(7) a solid state switching device capable of converting the polyphase current output to any frequency;

(8) a motor case made of a magnetic material;

(9) at least one conventional motor stator winding with laminations;

(10) a solid motor rotor having at least two lobes made of magnetic material, the lobes protruding outward from the rotor, and said motor rotor capable of rotating relative to the motor stator with and air gap between said motor stator and said motor rotor;

(11) a motor field winding adjacent to said stator capable of polarizing said lobes on said motor rotor such that said lobes have a north pole at one end and a south pole at the other end and the motor field winding is capable of changing the strength of the polarization of said lobes by means of a variable d-c current through the motor field winding;

(12) a sensor capable of sensing the speed and position of said motor rotor;

(13) a solid state motor control capable of varying the d-c current through said motor field winding and capable of receiving signals from the sensor and capable of changing the frequency of the polyphase current applied to said motor stator such that the frequency of the polyphase current applied to said motor stator is always synchronized with the frequency of said motor rotor; and

(14) the frequency of the polyphase output from said alternator stator is controlled by the solid state switching device and said output is directed to the motor stator and drives the motor rotor, the solid state motor control controls the speed of said motor rotor by varying the d-c current in said motor field winding, the solid state power device receives the signals from said sensor, said solid state power device also controls said solid state switching device such that the frequency of the polyphase output from said alternator stator is always synchronized with the speed of said motor rotor.

10. The electric power system including an alternator and motor of claim 9 in which said solid alternator rotor is not solid, but has a hollow squirrel cage configuration having at least two lobes which are capable of being polarized.

11. The electric power system including an alternator and motor of claim 9 in which said solid motor rotor is not solid, but has a hollow squirrel cage configuration having at least two lobes which are capable of being polarized.

* * * * *